(12) United States Patent
Benson et al.

(10) Patent No.: US 10,787,064 B2
(45) Date of Patent: Sep. 29, 2020

(54) DOOR ASSEMBLIES AND VEHICLES INCLUDING OUTER AND INNER BULKHEADS TO TRANSFER A SIDE IMPACT LOAD TO A PILLAR STRUCTURE AND METHODS INCORPORATING THE SAME

(71) Applicant: Toyota Motor Engineering & Manufacturing North America, Inc., Plano, TX (US)

(72) Inventors: Blaine C. Benson, Ann Arbor, MI (US); Keith O'Brien, Highland, MI (US); Michitomo Matsuoka, Nisshin (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 105 days.

(21) Appl. No.: 16/170,514

(22) Filed: Oct. 25, 2018

(65) Prior Publication Data

US 2020/0130482 A1   Apr. 30, 2020

(51) Int. Cl.
*B60J 5/04*     (2006.01)
*B62D 25/04*    (2006.01)

(52) U.S. Cl.
CPC .......... *B60J 5/0458* (2013.01); *B60J 5/0429* (2013.01); *B60J 5/0437* (2013.01); *B60J 5/0443* (2013.01); *B62D 25/04* (2013.01)

(58) Field of Classification Search
CPC ...... B60J 5/0458; B60J 5/0429; B60J 5/0437; B60J 5/0443; B62D 25/04
See application file for complete search history.

(56) References Cited

U.S. PATENT DOCUMENTS

| 4,922,596 A | * | 5/1990 | Wycech | B60J 5/0437 |
| | | | | 29/530 |
| 8,231,167 B2 | | 7/2012 | Endo et al. | |
| 8,960,768 B2 | | 2/2015 | Kato et al. | |
| 9,809,091 B2 | * | 11/2017 | Benson | B60J 5/0468 |
| 2010/0231003 A1 | * | 9/2010 | Okumura | B62D 21/157 |
| | | | | 296/193.06 |

(Continued)

FOREIGN PATENT DOCUMENTS

| EP | 2371678 B1 | 8/2012 |
| JP | 2010155509 A | 7/2010 |
| JP | 2011194903 A | 10/2011 |

*Primary Examiner* — Lori L Lyjak

(74) *Attorney, Agent, or Firm* — Dinsmore & Shohl LLP

(57) ABSTRACT

A door assembly, of a vehicle that includes a first pillar structure and a second pillar structure, includes a door outer panel, a door inner panel coupled to and positioned inwardly of the door outer panel, and an impact beam positioned between the door outer panel and the door inner panel. The door impact beam includes a first end and an opposite second end, the first end overlaps the first pillar structure and the second end overlaps the second pillar structure. The door assembly further includes an inner bulkhead coupled to the door inner panel and positioned between the door inner panel and the first end of the impact beam, and an outer bulkhead coupled to the door inner panel and positioned between the inner bulkhead and the first end of the impact beam, the outer bulkhead overlaps a portion of the inner bulkhead.

14 Claims, 5 Drawing Sheets

(56) References Cited

U.S. PATENT DOCUMENTS

2014/0375078 A1* 12/2014 Fujihara ................. B60J 5/0443
                                                    296/146.6
2018/0043938 A1   2/2018 Tsuneyama
2018/0170156 A1*  6/2018 Kwak .................. B21D 22/025
2018/0208029 A1*  7/2018 Tanaka ................. B60J 5/0443

* cited by examiner

US 10,787,064 B2

DOOR ASSEMBLIES AND VEHICLES INCLUDING OUTER AND INNER BULKHEADS TO TRANSFER A SIDE IMPACT LOAD TO A PILLAR STRUCTURE AND METHODS INCORPORATING THE SAME

TECHNICAL FIELD

The present specification generally relates to door assemblies for a vehicle, and more particularly, door assemblies including an outer bulkhead and an inner bulkhead.

BACKGROUND

Vehicles may be equipped with structures that absorb and direct forces and/or energy associated with an impact. The vehicle structures divert and absorb the energy associated with the impact into energy that deforms the vehicle structures. The vehicle structures may be designed to accommodate the introduction of the energy of the impact, such that the energy associated with the impact may be controllably dissipated and directed through selective and preferential deformation of the vehicle structures.

In one example, a vehicle may include a side pillar assembly. The side of the vehicle may be struck by an object or barrier in what is referred to herein as a side impact. In a side impact, the object or barrier may strike the side of the vehicle in the vehicle lateral direction, which may cause the side pillar assembly to intrude into the cabin of the vehicle.

Accordingly, a need exists for alternative structures for directing energy associated with a side impact to minimize intrusion of the side pillar assembly into the cabin of the vehicle.

SUMMARY

In one embodiment, a door assembly of a vehicle includes a first pillar structure and a second pillar structure positioned rearward of the first pillar structure in a vehicle longitudinal direction. The door assembly comprises a door outer panel, a door inner panel coupled to and positioned inwardly of the door outer in a vehicle lateral direction, and an impact beam positioned between the door outer panel and the door inner panel. The door impact beam includes a first end and an opposite second end, and the first end overlaps the first pillar structure and the second end overlaps the second pillar structure. The door assembly further comprises an inner bulkhead coupled to the door inner panel and positioned between the door inner panel and the first end of the impact beam, and an outer bulkhead coupled to the door inner panel and positioned between the inner bulkhead and the first end of the impact beam, the outer bulkhead overlaps a portion of the inner bulkhead.

In another embodiment, a vehicle comprises a first pillar structure, a second pillar structure positioned rearward of the first pillar structure, a door outer panel, and a door inner panel coupled to and positioned inwardly of the door outer panel in a vehicle lateral direction. The vehicle further comprises an impact beam positioned between the door outer panel and the door inner panel. The door impact beam includes a first end and an opposite second end, and the first end overlaps the first pillar structure and the second end overlaps the second pillar structure. The vehicle comprises an inner bulkhead coupled to the door inner panel and positioned between the door inner panel and the first end of the impact beam, and an outer bulkhead coupled to the door inner panel and positioned between the inner bulkhead and the first end of the impact beam, the outer bulkhead overlaps a portion of the inner bulkhead.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
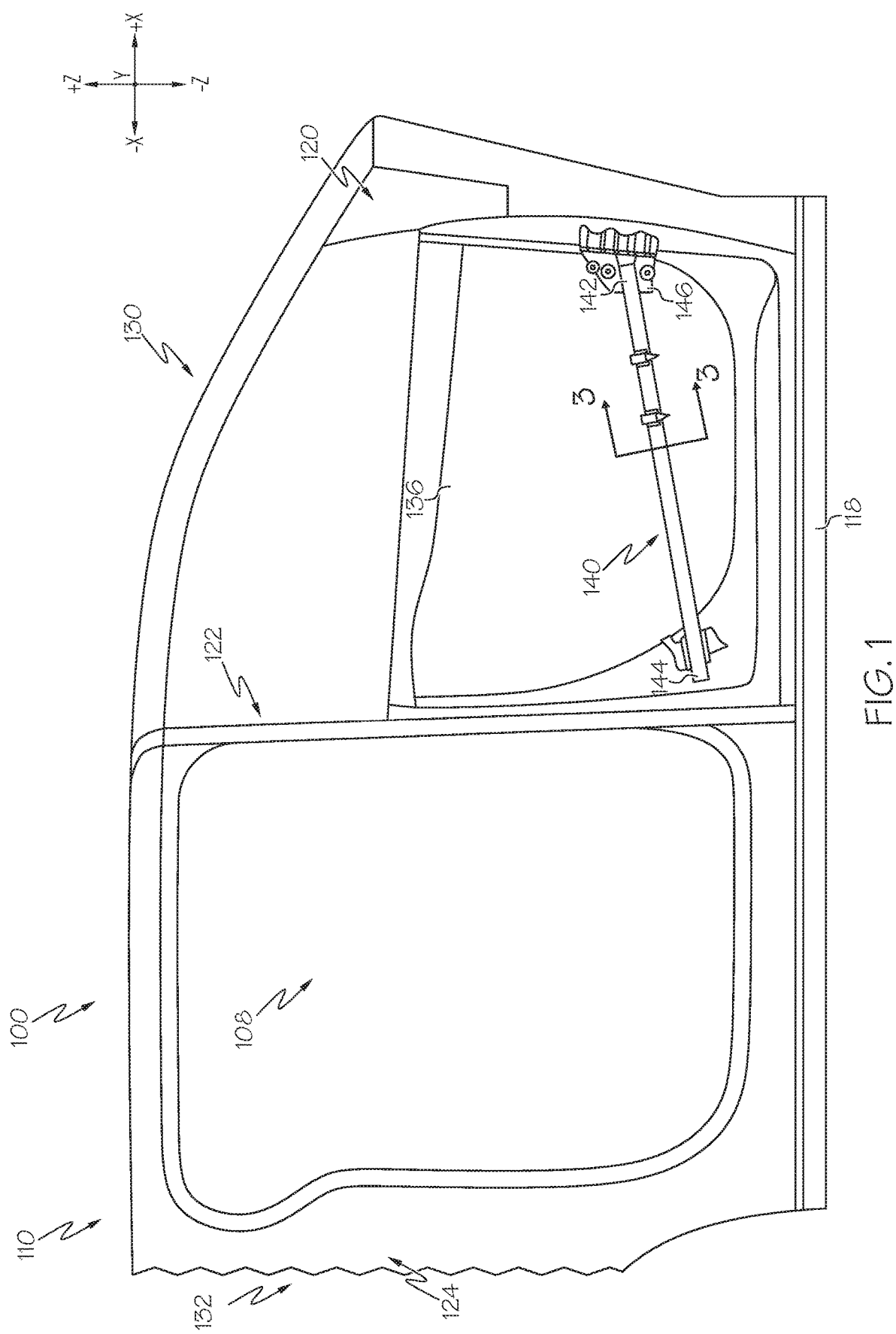
FIG. 1 schematically depicts a side view of a vehicle including a front door assembly including a door impact beam according to one or more embodiments shown or described herein.

Door assemblies and vehicles including door assemblies are disclosed herein. In one embodiment, a door assembly includes a first pillar structure and a second pillar structure positioned rearward of the first pillar structure in a vehicle longitudinal direction. The door assembly includes a door outer panel, a door inner panel coupled to and positioned inwardly of the door outer panel in a vehicle lateral direction, and an impact beam positioned between the door outer panel and the door inner panel, the door impact beam includes a first end and an opposite second end, the first end overlaps the first pillar structure and the second end overlaps the second pillar structure. The door assembly further includes an inner bulkhead coupled to the door inner panel and positioned between the door inner panel and the first end of the impact beam, and an outer bulkhead coupled to the door inner panel and positioned between the inner bulkhead and the first end of the impact beam, the outer bulkhead overlaps a portion of the inner bulkhead. Various embodiments of door assemblies are described in detail below with reference to the appended drawings.

As used herein, the term "vehicle longitudinal direction" refers to the forward-rearward direction of the vehicle (i.e., in the +/− vehicle X-direction as depicted). The term "vehicle lateral direction" refers to the cross-vehicle direction of the vehicle (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components of the vehicle. The term "outboard" as used herein refers to the relative location of a component in direction with respect to a vehicle centerline. The term "inboard" as used herein refers to the relative location of a component in direction with respect to the vehicle centerline. Because the vehicle may be generally symmetrical about the vehicle centerline, the terms "inboard" and "outboard" may be switched when evaluating components positioned along opposite sides of the vehicle. Further, while certain components of the vehicle are described as extending in one of the identified directions or oriented toward one of the identified directions, it should be understood that these components extend or are oriented in at least these recited directions.

Motor vehicles that incorporate elements according to the present disclosure may include a variety of construction methodologies that are conventionally known, including the unibody construction methodology as depicted, as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring to FIG. 1, a vehicle 100 is depicted. The vehicle 100 includes a body 110 onto which a vehicle drivetrain is coupled. The vehicle 100 also includes a cabin 108 that is integral with the body 110. The cabin 108 generally defines a passenger cabin of the vehicle 100. The body 110 includes a rocker support 118 that extends in the vehicle longitudinal direction. The body 110 of the vehicle 100 includes a plurality of pillar structures. In particular, the body 110 includes an A-pillar 120, a B-pillar 122, and a C-pillar 124 that extend upward from the rocker support 118 in the vehicle vertical direction. The A-pillar 120 is positioned forward of the B-pillar 122 and the B-pillar 122 is positioned forward of the C-pillar 124 in the vehicle longitudinal direction. Other bodies may include additional pillar structures, such as a D-pillar and E-pillar. As used herein the terms "forward pillar structure" and "rearward pillar structure" are used to refer to the relative location of the A-pillar 120, B-pillar 122, and the C-pillar 124 with respect to one another. For example, in one embodiment, the A-pillar 120 is a forward pillar structure and the B-pillar 122 is a rearward pillar structure that is positioned rearward of the forward pillar structure in the vehicle longitudinal direction. In embodiments, the B-pillar 122 can be the forward pillar structure and the C-pillar 124 can be the rearward pillar structure that is positioned rearward of the forward pillar structure in the vehicle longitudinal direction.

Figure 2:
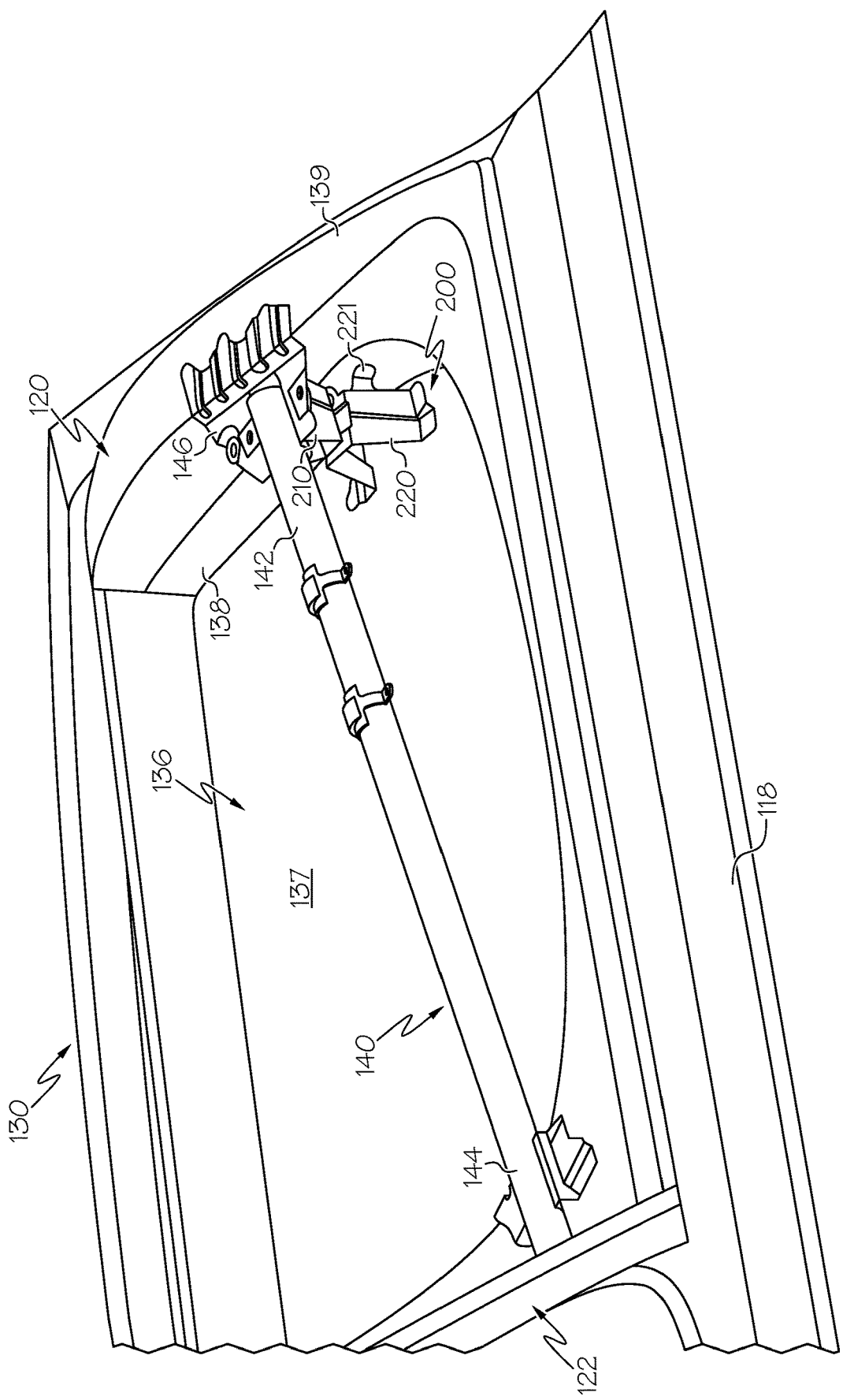
FIG. 2 schematically depicts a perspective view of the door impact beam coupled to the door assembly of FIG. 1 according to one or more embodiments shown or described herein.
Figure 3:
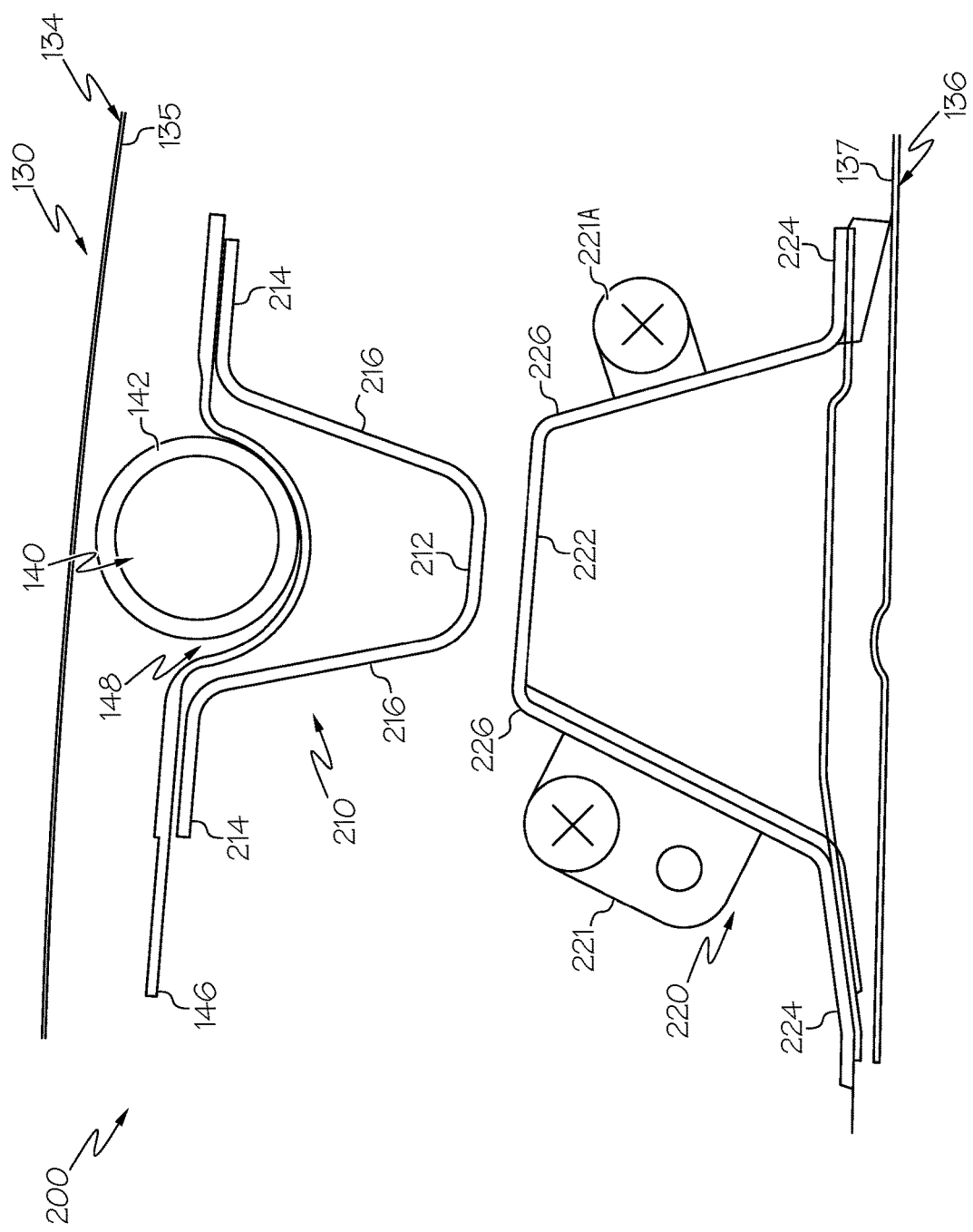
FIG. 3 schematically depicts a cross section view of the door assembly of FIG. 1 taken along the line 3-3 according to one or more embodiments shown or described herein.

The vehicle 100 includes one or more door assemblies coupled to the body 110 of the vehicle 100. A front door assembly 130 is coupled to the A-pillar 120 and a rear door assembly is coupled to the B-pillar 122. In some embodiments, the front door assembly 130 is hingedly coupled to the A-pillar 120 and the rear door assembly is hingedly coupled to the B-pillar 122. In other embodiments, the rear door assembly may be severally coupled to the B-pillar 122, such as when the rear door assembly 132 is sliding door or when the rear door assembly is hingedly coupled to the C-pillar 124 (i.e., a rear-hinged door). The front door assembly 130 and the rear door assembly facilitate ingress and egress to the cabin 108 of the vehicle 100. The front door assembly 130 includes a door outer panel 134, as shown in FIG. 2, and a door inner panel 136 as shown in FIG. 3 that is coupled to and positioned inwardly of the door outer panel 134 in a vehicle lateral direction. In particular, the door outer panel 134 is coupled to and positioned outboard of the door inner panel 136 in the vehicle lateral direction.

Referring to FIG. 2, the front door assembly 130 includes a door impact beam 140 positioned within the front door assembly 130. The door impact beam 140 extends in the vehicle longitudinal direction within the front door assembly 130 such that the door impact beam 140 is disposed between the door outer panel 134 and the door inner panel 136. In some embodiments, the door impact beam 140 is coupled to at least one of the door outer panel 134 or the door inner panel 136 of the front door assembly 130. The door impact beam 140 extends between the A-Pillar 120 and the B-Pillar 122 of the body 110. As will be described in greater detail below, at least a portion of the door impact beam 140 is positioned to at least partially overlap with the A-Pillar 120 and the B-Pillar 122 of the body 110. In some embodiments, the door impact beam 140 may increase the strength and/or the stiffness of the front door assembly 130. It should be understood that in other embodiments the rear door assembly may include a door impact beam 140 positioned therein such that the vehicle 100 includes additional door impact beams 140 extending in the vehicle longitudinal direction than that depicted in FIG. 2.

Referring to FIGS. 2 and 3, in one embodiment, the door impact beam 140 may have generally circular or elliptical profile. In particular, the door impact beam 140 may include a generally hollow structure with an enclosed cross-section. It is appreciated, that the door impact beam 140 may have other profiles, for example, a generally rectangular profile, or other regular or irregular profiles. The door impact beam 140 extends between and is secured to the front door assembly 130 at adjacent pillar structures of the body 110. In particular, the door impact beam 140 of the present example includes a first end portion 142 that is positioned to at least partially overlap with the A-Pillar 120 in the vehicle longitudinal direction. As will be described in greater detail herein, the first end portion 142 of the front door assembly 130 is coupled to an impact beam paddle 146 of the front door assembly 130. The door impact beam 140 further includes an opposite, second end portion 144 that is positioned to at least partially overlap with the B-Pillar 122 in the vehicle longitudinal direction.

Still referring to FIGS. 2 and 3, the front door assembly 130 further includes an impact assembly 200 disposed between the door outer panel 134 and the door inner panel 136 and positioned adjacent to the A-Pillar 120 of the body 110. The impact assembly 200 includes an outer bulkhead 210 and an inner bulkhead 220. The outer bulkhead 210 is coupled to the impact beam paddle 146 and the inner bulkhead 220 coupled to the door inner panel 136. The outer bulkhead 210 is positioned between the inner bulkhead 220 and the first end portion 142 of the door impact beam 140, and positioned so as to overlap a portion of the A-Pillar 120. The inner bulkhead 220 is positioned between the door inner panel 136 and the outer bulkhead 210, and positioned so as to overlap a portion of the A-Pillar 120. The outer bulkhead 210 of the impact assembly 200 is positioned within the front door assembly 130 such that the outer bulkhead 210 overlaps with at least a portion of the inner bulkhead 220 and the inner bulkhead 220 is similarly positioned within the front door assembly 130 such that the inner bulkhead 220 overlaps with at least a portion of the outer bulkhead 210. Collectively, the outer bulkhead 210 and the inner bulkhead 220 of the door assembly are positioned to overlap with the A-Pillar 120 such that the impact assembly 200 is aligned with the A-Pillar 120. The impact assembly 200 may be formed of various materials including steel, plastic, and/or other high strength material.

Still referring to FIGS. 2 and 3, the door outer panel 134 of the front door assembly 130 includes an interior surface 135 and the door inner panel 136 of the front door assembly 130 includes an exterior surface 137 that faces the interior surface 135 of the door outer panel 134. The door inner panel 136 further 140 includes a side wall 138 that extends generally parallel to the vehicle lateral direction from the exterior surface 137 of the door inner panel 136, such that the side wall 138 extends from the exterior surface 137 toward the interior surface 135 of the door outer panel 134. The door inner panel 136 further includes an outer wall 139 that extends generally parallel to the vehicle longitudinal direction from a distal edge of the side wall 138, such that the outer wall 139 extends parallel to the exterior surface 137 and the interior surface 135.

The door impact beam 140 of the front door assembly 130 further includes an impact beam paddle 146 that is securely fastened to the outer wall 139 of the door inner panel 136. The impact beam paddle 146 is coupled to the door impact beam 140 at the first end portion 142 such that the impact beam paddle 146 supports the first end portion 142 of the door impact beam 140. In particular, the impact beam paddle 146 includes an impact beam slot 148 sized and shaped to receive at least a portion of the first end portion 142 of the door impact beam 140 therein. The outer bulkhead 210 of the impact assembly 200 is coupled to the outer wall 139 of the door inner panel 136, and is further coupled to the impact beam paddle 146. In some embodiments, the first end portion 142 of the door impact beam 140 is welded to the impact beam slot 148 of the door impact beam 140. In some embodiments, the impact beam paddle 146 is welded to the door inner panel 136, for example, the impact beam paddle 146 is welded to the outer wall 139 of the door inner panel 136.

The inner bulkhead 220 includes one or more fastening tabs 221 that are used securely fasten the inner bulkhead 220 to the door inner panel 136. In particular, the fastening tabs 221 of the inner bulkhead 220 extend outwardly from the inner bulkhead 220 to engage the side wall 138 of the door inner panel 136. In the present example, the inner bulkhead 220 includes a pair of fastening tabs 221 extending therefrom for receiving a fastener 221A therein (e.g., screw, bolt, nail, pin, and the like). It should be understood that the inner bulkhead 220 may include additional or fewer fastening tabs 221 thereon and/or may include various other forms of fastening tabs 221 than those depicted and described herein. In some embodiments, the fastening tabs 221 are welded to the side wall 138 of the door inner panel 136.

Referring to FIG. 3, inner bulkhead 220 is secured to the door inner panel 136 along a position that is in alignment with the A-Pillar 120 of the body 110 such that the inner bulkhead 220 at least partially overlaps with the A-Pillar 120. The inner bulkhead 220, when in a default position, is separated from the A-Pillar 120 (i.e., spaced apart in the vehicle lateral direction) such that the inner bulkhead 220 is disengaged from the A-Pillar 120. The outer bulkhead 210, when in a default position, is separated from the inner bulkhead 220 of the impact assembly 200 (i.e., spaced apart in the vehicle lateral direction) such that the outer bulkhead 210 is disengaged from the inner bulkhead 220. It should be understood that various degrees of spacing may be included between the outer bulkhead 210 and the inner bulkhead 220. For example, a spacing of about 5.0 millimeter may be included between the outer bulkhead 210 and the inner bulkhead 220. It should be understood that in some embodiments the outer bulkhead 210 abuts against the inner bulkhead 220 in a default position such that no spacing is disposed therebetween. The outer bulkhead 210 is positioned in alignment with the inner bulkhead 220 such that the outer bulkhead 210 at least partially overlaps with the A-Pillar 120.

In some embodiments, the outer bulkhead 210 may include an outer contact wall 212, a pair of outer flanges 214, and a pair of outer sidewalls 216 that are integrally formed together. In some embodiments, the pair of outer sidewalls 216 may extend between the outer contact wall 212 and the pair of outer flanges 214 such that the outer contact wall 212 and the pair of outer flanges 214 are separated from one another by the pair of outer sidewalls 216 extending therebetween. The outer contact wall 212 of the outer bulkhead 210 may be disposed between the pair of outer sidewalls 216 to thereby generally form a "U-shaped" member of the outer bulkhead 210. Further, the pair of outer flanges 214 extends laterally outward relative to the pair of outer sidewalls 216 and the outer contact wall 212. With the outer bulkhead 210 coupled to the outer wall 139 of the door inner panel 136, the outer contact wall 212 is positioned adjacent to the exterior surface 137 of the door inner panel 136 and the pair of outer flanges 214 is positioned adjacent to the interior surface 135 of the door outer panel 134, relative to the outer contact wall 212. The pair of outer flanges 214 of the outer bulkhead 210 are sized and shaped to engage the impact beam paddle 146 of the door impact beam 140 to thereby couple the outer bulkhead 210 with the impact beam paddle 146. It should be understood that in other embodiments the outer contact wall 212, the pair of outer flanges 214, and the pair of outer sidewalls 216 may be separate features that are individually assembled together to form the outer bulkhead 210. In some embodiments, the pair of outer flanges 214 are welded to the impact beam paddle 146.

The inner bulkhead 220 includes an inner contact wall 222, a pair of inner flanges 224, and a pair of inner sidewalls 226 that are integrally formed together. In particular, the pair of inner sidewalls 226 extends between the inner contact wall 222 and the pair of inner flanges 224 such that the inner contact wall 222 and the pair of inner flanges 224 are separated from one another by the pair of inner sidewalls 226 extending therebetween. The inner contact wall 222 of the inner bulkhead 220 is disposed between the pair of inner sidewalls 226 to thereby generally form a "U-shaped" member of the inner bulkhead 220. Further, the pair of inner flanges 224 extends laterally outward relative to the pair of inner sidewalls 226 and the inner contact wall 222.

The inner bulkhead 220 is coupled to the exterior surface 137 of the door inner panel 136, and in particular, the pair of inner flanges 224 is positioned against and coupled to the door inner panel 136 along the exterior surface 137. Accordingly, with the pair of inner flanges 224 positioned adjacent to the exterior surface 137 of the door inner panel 136, the inner contact wall 222 of the inner bulkhead 220 is positioned adjacent to the outer bulkhead 210, relative to the pair of inner flanges 224. It should be understood that in other embodiments the inner contact wall 222, the pair of inner flanges 224, and the pair of inner sidewalls 226 may be separate features that are individually assembled together to form the inner bulkhead 220. As will be described in greater detail herein, the inner contact wall 222 of the inner bulkhead is sized and shaped to interlock with the outer contact wall 212 of the outer bulkhead 210, to thereby couple the inner bulkhead 220 with the outer bulkhead 210, in response to the outer bulkhead 210 engaging the inner bulkhead 220.

Still referring to FIG. 3, the outer bulkhead 210 of the impact assembly 200 is spaced apart from the inner bulkhead 220 of the impact assembly 200. In particular, outer contact wall 212 of the outer bulkhead 210 is laterally offset in the vehicle lateral direction from the inner contact wall 222 of the inner bulkhead 220 when the impact assembly 200 is in a default, disengaged position.

When a vehicle is involved in an impact, vehicle structures may elastically and plastically deform to absorb energy. The vehicle structures divert and absorb the energy associated with the impact into energy that deforms the vehicle structures. The vehicle structures may be designed to accommodate the introduction of the energy of the impact, such that the energy associated with the impact may be controllably dissipated and directed through selective and preferential deformation of the vehicle structures. The side of the vehicle may be struck by an object or barrier in what is referred to herein as a side impact. In a side impact, the object or barrier may strike the side of the vehicle in the vehicle lateral direction.

Figure 4A:
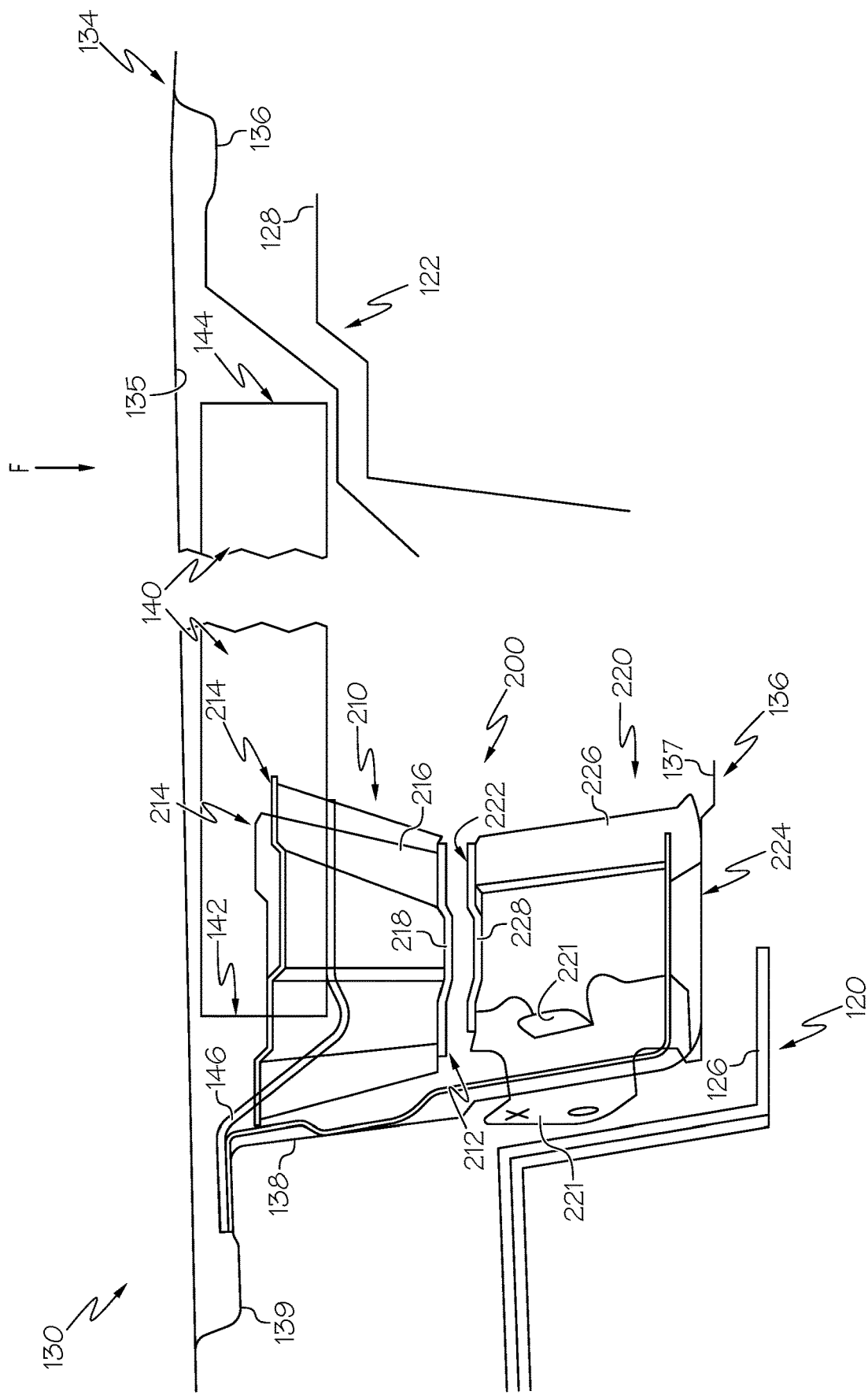
FIG. 4A schematically depicts a section view of the door impact beam of FIG. 1 in a default position and with the door assembly of FIG. 3 in a disengaged position according to one or more embodiments shown or described herein.
Figure 4B:
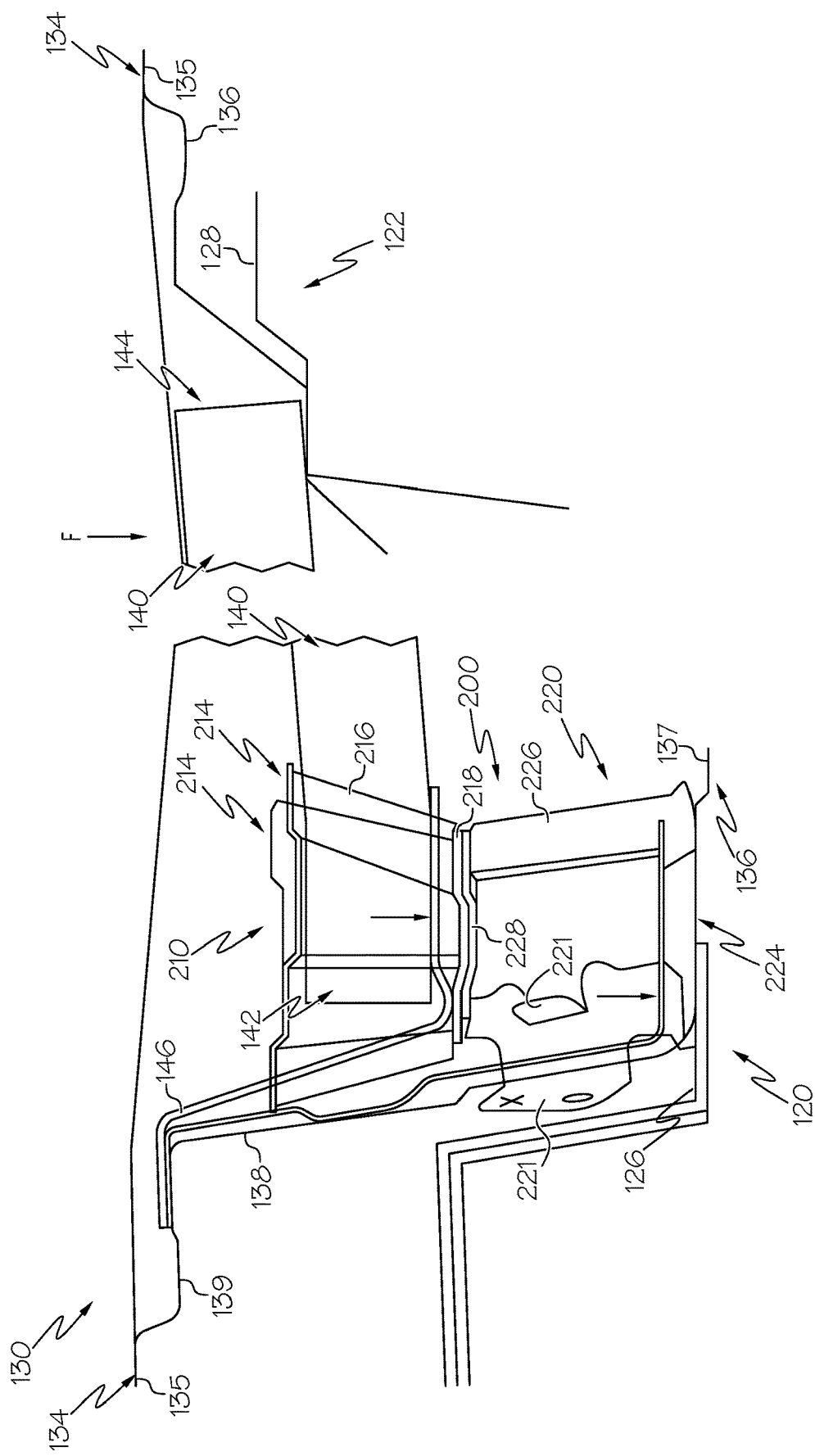
FIG. 4B schematically depicts a section view of the door impact beam of FIG. 1 in a deflected position and with the front door assembly in an engaged position according to one or more embodiments shown or described herein.

Referring to FIGS. 4A-4B, a side impact F applied to the vehicle 100 is depicted. In particular, the side impact F is applied at the front door assembly 130 in the vehicle lateral direction. Energy and/or forces associated with the side impact F cause the door outer panel 134 of the front door assembly 130 to deform and translate inboard in the vehicle lateral direction toward the door inner panel 136.

Referring initially to FIG. 4A, the side impact F is presented at the front door assembly 130, specifically, the door outer panel 134. In this instance, forces and/or energy associated with the impact cause the door outer panel 134 to plastically and elastically deform laterally inward toward the door inner panel 136 of the front door assembly 130. As the door outer panel 134 deforms inwardly in the vehicle lateral direction, the door impact beam 140 receives a portion of the side impact force F and deforms inwardly in the vehicle lateral direction. As the side impact load F is applied to the door impact beam 140, the load and/or energy generated from the side impact load F is translated along a longitudinal length of the door impact beam 140 to the first end portion 142 and the second end portion 144.

Referring to FIG. 4B, as the door outer panel 134 and the door impact beam 140 deform inwardly in the vehicle lateral direction, the second end portion 144 of the door impact beam 140 deforms inwardly such that the door inner panel 136 contacts a pillar surface 128 of the B-Pillar 122. As the second end portion 144 overlaps at least a portion of the B-Pillar 122, a portion of the side impact load F is transferred from the door impact beam 140 to the B-Pillar 122.

Simultaneously, as the door outer panel 134 and the door impact beam 140 deform inwardly in the vehicle lateral direction, the first end portion 142 of the door impact beam 140 deforms inwardly in the vehicle lateral direction. As the first end portion 142 of the door impact beam 140 is coupled to the impact beam paddle 146 at the impact beam slot 148, and the impact beam paddle 146 is coupled to at least the outer bulkhead 210 of the impact assembly 200, the impact beam paddle 146 and the outer bulkhead 210 deform inwardly in the vehicle lateral direction with the door outer panel 134.

The outer bulkhead 210 deforms inwardly toward the inner bulkhead 220 of the impact assembly 200 in response to the impact beam paddle 146 engaging an interior side of the outer contact wall 212. Accordingly, the outer contact wall 212 translates in the vehicle lateral direction thereby transitioning the impact assembly 200 from a disengaged state as shown in FIG. 4A to an engaged state as shown in FIG. 4B. Additionally, the impact beam paddle 146 may further engage the pair of outer flanges 214 of the outer bulkhead 210 to thereby translate the pair of outer flanges 214 in the vehicle lateral direction. In this instance, the outer contact wall 212 deforms inwardly toward and engages the inner contact wall 222 of the inner bulkhead 220.

In response, with the outer bulkhead 210 urging the inner bulkhead 220 inwardly in the vehicle later direction, the inner bulkhead 220 deforms inboard toward the door inner panel 136 of the front door assembly 130 and the A-Pillar 120 until the impact assembly 200 and the door inner panel 136 engage a pillar surface 126 of the A-Pillar 120. Specifically, as the first end portion 142 of the door impact beam 140, the outer bulkhead 210, and the inner bulkhead 220 overlaps at least a portion of the A-Pillar 120, a portion of the side impact load F and/or energy generated by the side impact load F, which is applied to the front door assembly 130, is transferred from the door impact beam 140 to the A-Pillar 120 due to the transmission path between the first end portion 142 of the door impact beam 140, the outer bulkhead 210, the inner bulkhead 220, the door inner panel 136, and the A-Pillar 120.

Accordingly, at least a portion of the side impact load F is transferred from the door impact beam 140 to the B-Pillar 122 via the second end portion 144 and the door inner panel 136, at least a portion of the energy or load generated from the side impact load F is transferred from the door impact beam 140 to the A-Pillar 120 via the first end portion 142, the outer bulkhead 210, the inner bulkhead 220, and the door inner panel 136. As such, at least a portion of the energy or load generated from the side impact load F is transferred from the door impact beam 140 to both the A-Pillar 120 and the B-Pillar 122 to distribute the side impact load F to both the A-Pillar 120 and the B-Pillar 122 of the vehicle 100.

Still referring to FIGS. 4A and 4B, in some embodiments, the outer contact wall 212 of the outer bulkhead 210 may include an outer engagement mechanism in the form of a shaped protrusion 218, and the inner contact wall 222 of the inner bulkhead 220 may include a corresponding inner engagement mechanism in the form of a shaped recess 228. It should be understood that the shaped protrusion 218 on the outer contact wall 212 is sized and shaped to correspond with the size and shape of the shaped recess 228 on the inner contact wall 222 such that the shaped protrusion 218 is securely received within the shaped recess 228, thereby interlocking the outer bulkhead 210 to the inner bulkhead 220, when the outer contact wall 212 moves towards and engages the inner contact wall 222. The corresponding engagement of the shaped protrusion 218 and the shaped recess 228 provides for a mechanical resistance between the outer bulkhead 210 and the inner bulkhead 220 thereby restricting lateral movement of the outer bulkhead 210 relative to the inner bulkhead 220, and in particular the outer contact wall 212 relative to the inner contact wall 222, when the impact assembly 200 is in an engaged state. It should be understood that the outer bulkhead 210 and the inner bulkhead 220 may include various other corresponding engagement mechanisms along the outer contact wall 212 and inner contact wall 222, respectively.

In particular, the shaped protrusion 218 of the outer bulkhead 210 engages (i.e., is received within) the shaped recess 228 to thereby effectively transfer the load from the outer bulkhead 210 to the inner bulkhead 220. Additionally, the corresponding engagement of the shaped protrusion 218 and the shaped recess 228 provides for a mechanical resistance between the outer bulkhead 210 and the inner bulkhead 220 to thereby restrict lateral movement of the outer bulkhead 210 relative to the inner bulkhead 220, and in particular the outer contact wall 212 relative to the inner contact wall 222.

Ensuring the outer contact wall 212 of the outer bulkhead 210 aligns with the inner contact wall 222 of the inner bulkhead 220, through the engagement of the corresponding engagement features (i.e., shaped protrusion 218 and shaped recess 228), provides an optimal surface area contact between the outer contact wall 212 of the outer bulkhead 210 and the inner contact wall 222 of the inner bulkhead 220. Accordingly, a greater surface area contact between the outer bulkhead 210 and the inner bulkhead 220 provides a greater degree of energy and/or load transfer from the outer bulkhead 210 to the inner bulkhead 220.

It should now be understood that vehicles according to the present disclosure include door assemblies and vehicles including door assemblies. In embodiments, a door assembly includes a door outer panel, a door inner panel that is coupled to and positioned inboard of the door outer panel in a vehicle lateral direction, an impact beam positioned between the door outer panel and the door inner panel, with the door impact beam including a first end and an opposite second end. The first end overlaps a first pillar structure of a vehicle and the second end overlaps a second pillar structure of the vehicle, with the second pillar structure positioned rearward of the first pillar structure in a vehicle longitudinal direction. The door assembly further includes an inner bulkhead coupled to the door inner panel and positioned between the door inner panel and the first end of the impact beam, and an outer bulkhead coupled to the door inner panel and positioned between the inner bulkhead and the first end of the impact beam, the outer bulkhead overlaps a portion of the inner bulkhead.

As the outer and inner bulkheads are coupled to at least the door outer panel and the door inner panel and the door impact beam is coupled to the door outer panel, the door impact beam and the outer and inner bulkheads translate inboard in the vehicle lateral direction with the door outer panel and toward the first pillar structure in response to a side impact at the second pillar structure. As outer and inner bulkheads are positioned in alignment with and at least partially overlapping with the first pillar structure, the outer and inner bulkheads translates inboard in the vehicle lateral direction and engage the first pillar structure to thereby distribute a load/energy from the side impact at the second pillar structure.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A door assembly of a vehicle that includes a first pillar structure and a second pillar structure positioned rearward of the first pillar structure in a vehicle longitudinal direction, the door assembly comprising:
    a door outer panel;
    a door inner panel coupled to and positioned inwardly of the door outer in a vehicle lateral direction;
    an impact beam positioned between the door outer panel and the door inner panel, the door impact beam includes a first end and an opposite second end, the first end overlaps the first pillar structure and the second end overlaps the second pillar structure;
    an inner bulkhead coupled to the door inner panel and positioned between the door inner panel and the first end of the impact beam, the inner bulkhead overlaps the first pillar structure; and
    an outer bulkhead coupled to the door inner panel and positioned between the inner bulkhead and the first end of the impact beam, the outer bulkhead overlaps a portion of the inner bulkhead and the first pillar structure,
    wherein in a side impact a load applied to the impact beam is transferred to the first pillar structure through the outer bulkhead, the inner bulkhead, and the door inner panel.

2. The door assembly of claim 1, wherein the outer bulkhead is spaced apart from the inner bulkhead, and in the side impact the load applied to the impact beam deforms the outer bulkhead inwardly in the vehicle lateral direction to contact the inner bulkhead to transmit the load applied to the impact beam to the first pillar structure.

3. The door assembly of claim 2, wherein the door outer panel includes an interior surface and the door inner panel includes exterior surface that faces the interior surface of the door outer panel, the door inner panel includes a side wall that extends generally parallel to the vehicle lateral direction from the exterior surface of the door inner panel, the door inner panel includes an outer wall that extends generally parallel to the vehicle longitudinal direction from a distal edge of the side wall,
    wherein the outer bulkhead is coupled to the outer wall of the door inner panel.

4. The door assembly of claim 3, wherein the impact beam includes an impact beam paddle that is coupled to the outer wall of the door inner panel, the impact beam paddle is coupled to and supports the first end of the impact beam,
    wherein the outer bulkhead is coupled to the impact beam paddle.

5. The door assembly of claim 4, wherein the outer bulkhead includes an outer contact wall, a pair of outer flanges, and a pair of outer side walls that extend between the outer contact wall and the pair of outer flanges, the pair of outer flanges are coupled to the impact beam paddle.

6. The door assembly of claim 5, wherein the inner bulkhead includes an inner contact wall, a pair of inner flanges, and a pair of inner side walls that extend between the outer contact wall and the pair of inner flanges, the pair of inner flanges are coupled to the exterior surface of the door inner panel.

7. The door assembly of claim 6, wherein one of the outer contact wall and the inner contact wall includes a shaped recess and the other of the outer contact wall and the inner contact wall includes a shaped protrusion that corresponds to the shaped recess,
    wherein in the side impact the shaped protrusion is received within the shaped recess to transfer the load applied to the impact beam to the first pillar structure through the outer bulkhead, the inner bulkhead, and the door inner panel.

8. A vehicle comprising:
    a first pillar structure;
    a second pillar structure positioned rearward of the first pillar structure;
    a door outer panel;
    a door inner panel coupled to and positioned inwardly of the door outer panel in a vehicle lateral direction;

an impact beam positioned between the door outer panel and the door inner panel, the door impact beam includes a first end and an opposite second end, the first end overlaps the first pillar structure and the second end overlaps the second pillar structure;

an inner bulkhead coupled to the door inner panel and positioned between the door inner panel and the first end of the impact beam, the inner bulkhead overlaps the first pillar structure; and an outer bulkhead coupled to the door inner panel and positioned between the inner bulkhead and the first end of the impact beam, the outer bulkhead overlaps a portion of the inner bulkhead and the first pillar structure, wherein in a side impact a load applied to the impact beam is transferred to the first pillar structure through the outer bulkhead, the inner bulkhead, and the door inner panel.

9. The vehicle of claim 8, wherein the outer bulkhead is spaced apart from the inner bulkhead, and in the side impact the load applied to the impact beam deforms the outer bulkhead inwardly in the vehicle lateral direction to contact the inner bulkhead to transmit the load applied to the impact beam to the first pillar structure.

10. The vehicle of claim 9, wherein the door outer panel includes an interior surface and the door inner panel includes exterior surface that faces the interior surface of the door outer panel, the door inner panel includes a side wall that extends generally parallel to the vehicle lateral direction from the exterior surface of the door inner panel, the door inner panel includes an outer wall that extends generally parallel to a vehicle longitudinal direction from a distal edge of the side wall, wherein the outer bulkhead is coupled to the outer wall of the door inner panel.

11. The vehicle of claim 10, wherein the impact beam includes an impact beam paddle that is coupled to the outer wall of the door inner panel, the impact beam paddle is coupled to and supports the first end of the impact beam, wherein the outer bulkhead is coupled to the impact beam paddle.

12. The vehicle of claim 11, wherein the outer bulkhead includes an outer contact wall, a pair of outer flanges, and a pair of outer side walls that extend between the outer contact wall and the pair of outer flanges, the pair of outer flanges are coupled to the impact beam paddle.

13. The vehicle of claim 12, wherein the inner bulkhead includes an inner contact wall, a pair of inner flanges, and a pair of inner side walls that extend between the outer contact wall and the pair of inner flanges, the pair of inner flanges are coupled to the exterior surface of the door inner panel.

14. The vehicle of claim 13, wherein one of the outer contact wall and the inner contact wall includes a shaped recess and the other of the outer contact wall and the inner contact wall includes a shaped protrusion that corresponds to the shaped recess, wherein in the side impact the shaped protrusion is received within the shaped recess to transfer the load applied to the impact beam to the first pillar structure through the outer bulkhead, the inner bulkhead, and the door inner panel.

* * * * *

UNITED STATES PATENT AND TRADEMARK OFFICE
CERTIFICATE OF CORRECTION

PATENT NO. : 10,787,064 B2
APPLICATION NO. : 16/170514
DATED : September 29, 2020
INVENTOR(S) : Blaine C. Benson, Keith O'Brien and Michitomo Matsuoka Page 1 of 1

It is certified that error appears in the above-identified patent and that said Letters Patent is hereby corrected as shown below:

On the Title Page

Item (72), inventor 3, city, delete "Nisshin" and insert --Nisshin-city Aichi--, therefor.

Signed and Sealed this
Twenty-fourth Day of November, 2020

Andrei Iancu
*Director of the United States Patent and Trademark Office*